US010339168B2

United States Patent
Dole et al.

(10) Patent No.: US 10,339,168 B2
(45) Date of Patent: *Jul. 2, 2019

(54) SYSTEM AND METHOD FOR GENERATING FULL QUESTIONS FROM NATURAL LANGUAGE QUERIES

(71) Applicant: International Business Machines Corporation, Armonk, NY (US)

(72) Inventors: Bryn R. Dole, Sunnyvale, CA (US); William S. Ko, Daly City, CA (US); Malous M. Kossarian, Redwood City, CA (US); Douglas A. Smith, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/261,339

(22) Filed: Sep. 9, 2016

(65) Prior Publication Data

US 2018/0075366 A1     Mar. 15, 2018

(51) Int. Cl.
*G06F 16/00*     (2019.01)
*G06F 16/33*     (2019.01)
(Continued)

(52) U.S. Cl.
CPC ...... *G06F 16/3344* (2019.01); *G06F 16/3329* (2019.01); *G06F 17/2775* (2013.01); *G06F 17/2881* (2013.01); *G06N 5/04* (2013.01)

(58) Field of Classification Search
CPC ............ G06F 16/3344; G06F 16/3329; G06F 16/367; G06F 16/30; G06F 16/313; G06F 16/90332; G06F 16/9038
See application file for complete search history.

(56) References Cited

U.S. PATENT DOCUMENTS 4,811,273 A * 3/1989 Kishimoto .......... G06F 15/0283
                                                            704/1
5,836,771 A * 11/1998 Ho .......................... G09B 5/00
                                                            434/362
(Continued)

FOREIGN PATENT DOCUMENTS

WO     WO-2015179326 A1     11/2015

OTHER PUBLICATIONS

Javnozon, D., Franklin, D. & Figueroa, J. N. (2009). Search Refinement Using Contextual choices. IP.com Prior Art DTD, IPCOM000181468D.
(Continued)

*Primary Examiner* — Ashish Thomas
*Assistant Examiner* — Rezwanul Mahmood
(74) *Attorney, Agent, or Firm* — Pepper Hamilton LLP

(57) ABSTRACT

Embodiments provide a computer implemented method, in a data processing system comprising a processor and a memory comprising instructions which are executed by the processor to cause the processor to implement a full question generation system, the method comprising ingesting, into the full question generation system, a query dataset derived from one or more search queries entered by one or more users of an internet search engine; identifying questions from the ingested query dataset; separating, through a full question identification module, one or more prior full questions from the ingested dataset; identifying, through a question intent query identification module, one or more question intent queries from the query dataset; for each identified question intent query: sorting, through a sorting module, the question intent query into one or more bins based on one or more missing interrogative words; and appending, through an appending module, the missing interrogative word and a verb onto the question intent query to generate a full
(Continued)

question; and ingesting, through the cognitive system, the one or more generated full questions as training dataset. The full question generation method can additionally generate un-canonical questions.

14 Claims, 5 Drawing Sheets

(51) Int. Cl.
*G06F 17/28* (2006.01)
*G06N 5/04* (2006.01)
*G06F 17/27* (2006.01)
*G06F 16/332* (2019.01)

(56) References Cited

U.S. PATENT DOCUMENTS

| | | | |
|---|---|---|---|
| 6,732,097 B1* | 5/2004 | Wakefield | G06F 16/316 707/999.004 |
| 7,640,254 B2* | 12/2009 | McConnell | G06F 16/288 707/999.003 |
| 7,836,044 B2 | 11/2010 | Kamvar et al. | |
| 8,060,390 B1* | 11/2011 | Overstreet | G06Q 10/06 705/7.11 |
| 8,082,264 B2 | 12/2011 | Bierner | |
| 8,135,712 B1* | 3/2012 | Coladonato | G06F 16/951 707/730 |
| 8,140,559 B2* | 3/2012 | Bobick | G06N 5/022 707/761 |
| 8,516,008 B1* | 8/2013 | Marquardt | G06F 16/2453 707/802 |
| 8,745,018 B1 | 6/2014 | Singleton et al. | |
| 9,063,983 B1* | 6/2015 | Lee | G06F 16/24565 |
| 9,318,027 B2* | 4/2016 | Byron | G09B 7/00 |
| 9,971,967 B2* | 5/2018 | Bufe, III | G06N 5/02 |
| 2002/0156809 A1* | 10/2002 | O'Brien | G09B 7/02 715/221 |
| 2002/0177991 A1* | 11/2002 | Ejerhed | G06F 17/277 704/2 |
| 2005/0091111 A1* | 4/2005 | Green | G06Q 30/02 705/14.59 |
| 2005/0164154 A1 | 7/2005 | Solomon | |
| 2005/0266387 A1* | 12/2005 | Rossides | G09B 7/00 434/323 |
| 2007/0130112 A1* | 6/2007 | Lin | G06F 16/41 707/999.002 |
| 2007/0156623 A1* | 7/2007 | Zhang | G06N 5/02 706/48 |
| 2008/0010259 A1* | 1/2008 | Feng | G06F 16/9537 707/999.003 |
| 2008/0104037 A1* | 5/2008 | Bierner | G06F 16/3322 707/999.003 |
| 2010/0153094 A1* | 6/2010 | Lee | G06F 16/3329 704/9 |
| 2010/0248757 A1* | 9/2010 | Baek | G06F 3/0237 455/466 |
| 2011/0078192 A1* | 3/2011 | Murdock, IV | G06F 16/3329 707/780 |
| 2011/0112993 A1* | 5/2011 | Zhang | G06F 16/30 706/12 |
| 2011/0125734 A1* | 5/2011 | Duboue | G09B 7/00 707/723 |
| 2011/0246910 A1* | 10/2011 | Moxley | G06Q 10/10 715/758 |
| 2012/0011139 A1* | 1/2012 | Drissi | G06F 16/2452 707/760 |
| 2012/0023097 A1 | 1/2012 | Lebeau et al. | |
| 2012/0115112 A1* | 5/2012 | Purushotma | G09B 5/06 434/157 |
| 2013/0014136 A1* | 1/2013 | Bhatia | H04N 21/252 725/9 |
| 2013/0124439 A1* | 5/2013 | Yamamoto | G06F 17/278 706/12 |
| 2014/0006446 A1* | 1/2014 | Carter | G06F 16/532 707/772 |
| 2014/0012787 A1* | 1/2014 | Zhang | G06N 5/02 706/12 |
| 2014/0316764 A1* | 10/2014 | Ayan | G10L 15/24 704/9 |
| 2014/0377735 A1* | 12/2014 | Byron | G09B 7/00 434/362 |
| 2015/0104763 A1* | 4/2015 | Hausmann | G06F 3/0481 434/169 |
| 2015/0193447 A1 | 7/2015 | Voinea et al. | |
| 2016/0042060 A1* | 2/2016 | Okamoto | G06F 16/90332 707/723 |
| 2016/0062980 A1* | 3/2016 | Boguraev | G06N 5/04 706/11 |
| 2016/0078087 A1* | 3/2016 | Wang | G06F 17/2785 707/706 |
| 2016/0132501 A1* | 5/2016 | Mengle | G06F 16/288 707/771 |
| 2016/0140187 A1* | 5/2016 | Bae | G06F 17/2785 707/722 |
| 2016/0217472 A1* | 7/2016 | Podgorny | G06Q 30/016 |
| 2017/0075877 A1* | 3/2017 | Lepeltier | G06F 17/2705 |
| 2017/0075988 A1* | 3/2017 | Kadiri | G06F 16/3329 |
| 2017/0124432 A1* | 5/2017 | Chen | G06N 3/0454 |
| 2017/0212895 A1* | 7/2017 | Ahmed | G06F 16/24522 |
| 2017/0228361 A1* | 8/2017 | Zhang | G06F 17/2705 |
| 2018/0075135 A1* | 3/2018 | Dole | G06F 7/08 |
| 2018/0075366 A1* | 3/2018 | Dole | G06F 17/2881 |
| 2018/0144047 A1* | 5/2018 | Beller | G06F 16/3329 |

OTHER PUBLICATIONS

Sengstock, C. & Gertz, M. (2011). Conquer: A System for Efficient Context-Aware Query Suggestions. 2011 Proceedings of the 20th international conference companion.

Lai, W.C., Dumoulin, B. & Wu, S. L. (2011). Method and System for Determining Intent of a User Query. IP.com Prior Art DTD, IPCOM000204187D.

Yuan et al., "Watson and healthcare: How natural language processing and semantic Search could revolutionize clinical decision support," IBM developerWorks, Apr. 12, 2011.

High, "The Era of Cognitive Systems: An Inside Look at IBM Watson and How it Works," IBM Redbooks, Dec. 12, 2012.

* cited by examiner

SYSTEM AND METHOD FOR GENERATING FULL QUESTIONS FROM NATURAL LANGUAGE QUERIES

TECHNICAL FIELD

The present application relates generally to a system and method that can be used to generate full questions from natural language queries.

BACKGROUND

There is a serious need within Watson and other natural language processing (NLP) applications to train question answering systems on large amounts of data, which can be accomplished through the use of training data that was created organically by people that, in their natural environment, would normally ask questions. Machine learning for natural language processing is especially difficult because it requires a great deal of data that represents a natural language query. Building chat bots or any interface that takes in input from a person and uses that to retrieve the correct 'answer' from a corpus of documents requires a large amount of training data. Oftentimes within these current processes, this process is painfully manual, and requires that many Subject Matter Experts spend months collecting questions from users or risk a useless training set that is not able to produce valuable results in the real world application.

When hosting a search engine, user search queries and relevant metadata are stored in an accessible database, and a subset of these queries can provide an excellent example of natural language questions. A database of user queries collected from the search box of a search engine represent natural language queries. Of the billions of queries, a small subset—about 1%—are fully formed questions with the standard interrogative words "who," "what," "when," "where," "why," and "how". However, many of the remaining queries can naturally read as full questions if an interrogative word was simply appended to the beginning. For example, "side effects of Tylenol" is really "what are the side effects of Tylenol," except that people have been trained to drop interrogative words from search engines to save time. By utilizing these partially formed questions, training sets for NLP models could be strengthened and brought to market faster.

SUMMARY

Embodiments can provide a computer implemented method, in a data processing system comprising a processor and a memory comprising instructions which are executed by the processor to cause the processor to implement a full question generation system for training a cognitive system comprising a question-answer system pipeline, the method comprising ingesting, into the full question generation system, a query dataset derived from one or more search queries entered by one or more users of an internet search engine; identifying questions from the ingested query dataset; separating, through a full question identification module, one or more prior full questions from the ingested dataset; identifying, through a question intent query identification module, one or more question intent queries from the query dataset; for each identified question intent query: sorting, through a sorting module, the question intent query into one or more bins based on one or more missing interrogative words; and appending, through an appending module, the missing interrogative word and a verb onto the question intent query to generate a full question; and ingesting, through the cognitive system, the one or more generated full questions as training dataset.

Embodiments can further provide a method further comprising identifying one or more question intent queries from the query dataset using one or more regular expressions to detect at least one trigger phrase contained in each question intent query.

Embodiments can further provide a method further comprising determining the plurality of the at least one trigger phrases; and applying a proper conjugation of the verb to the question intent query.

Embodiments can further provide a method further comprising analyzing, through the question-answer system pipeline, each of the one or more generated full questions contained in the training dataset; and training the full question generation system based on the analysis of the one or more generated full questions by the question-answer system pipeline.

Embodiments can further provide a method further comprising for each identified question intent query: generating one or more un-canonical full questions by appending an alternate interrogative work and verb to the question intent query.

Embodiments can further provide a method further comprising incorporating the one or more un-canonical full questions into the training dataset.

Embodiments can further provide a method further comprising analyzing, through the question-answer system pipeline, each of the one or more un-canonical full questions contained in the training dataset; and training the full question generation system based on the analysis of the one or more un-canonical full questions by the question-answer system pipeline.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
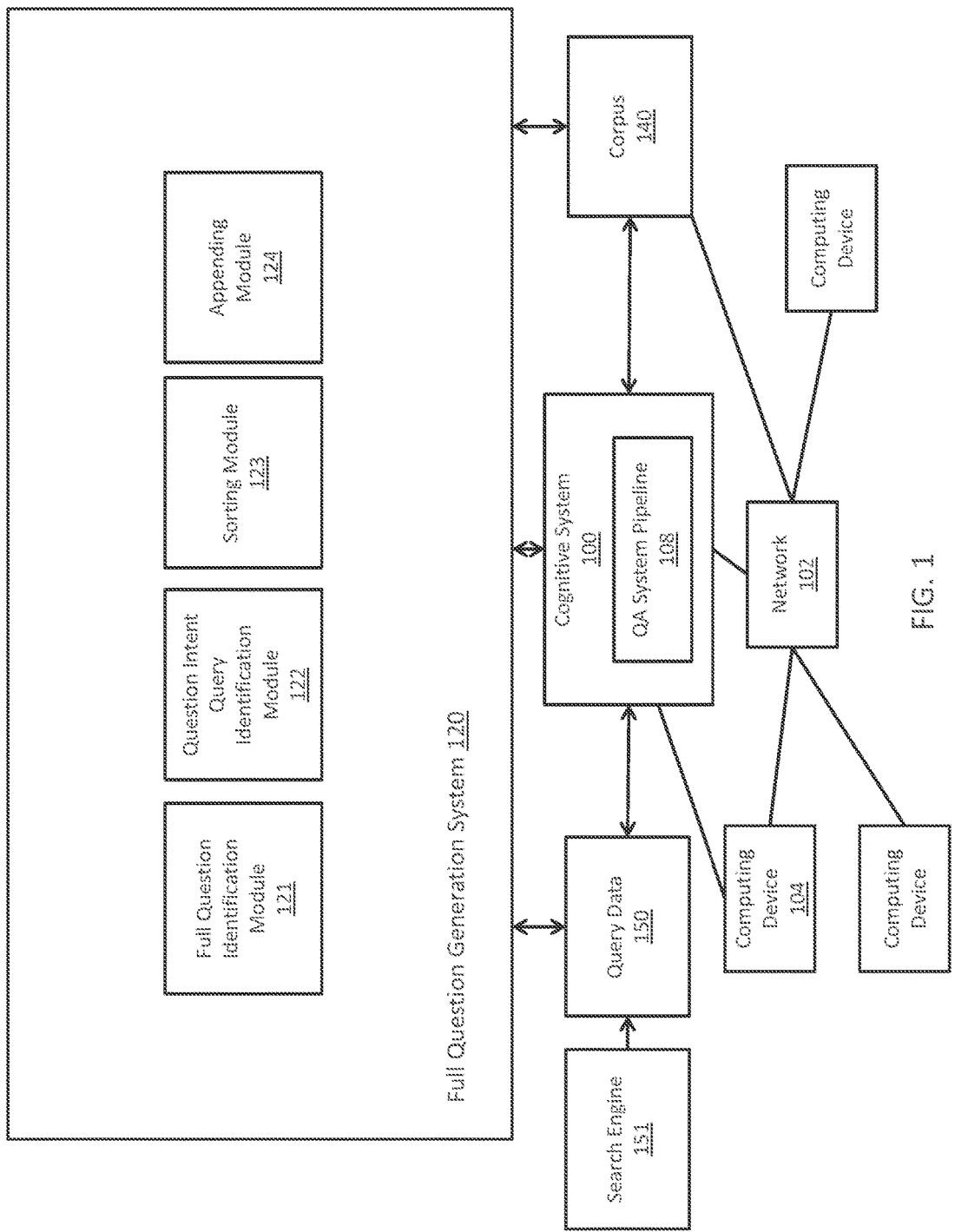
FIG. 1 depicts a schematic diagram of one illustrative embodiment of a cognitive system implementing a full question generation system in a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situation awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

User queries and questions entered into a search engine generally follow a keyword-based, "question-intent" syntax. In order to generate fully formed questions from these question-intent queries, regular expressions can be used for natural language processing (NLP). To efficiently do this, a full question generation system can group parsed queries by interrogative words. Syntactically correct, fully-formed questions can be generated based on these parsed queries by inserting other relevant interrogative words or verbs.

Prior systems parse stored user queries/questions to derive syntactic patterns. The full question generation system described herein can use specialized regular expressions for NLP to parse past user queries specifically to generate a large corpus of un-canonical question forms. Question generation function implementations in prior solutions focus on providing/predicting questions for a specific user-input. The present system can generate as many possible questions as can be recognized by a NLP system for each past user-query. Without attempting to address user need, the present full question generation system can output a greater number of un-canonical forms than prior solutions.

These generated question corpuses can be created more efficiently and in greater size than by using prior NLP methods due to use, in an embodiment, of search engine query data. The use of this search engine query data for question generation can increase question fidelity, which is the likelihood that a given question would be posed by a real person.

By taking advantage of the search engine query data, a larger set of natural language questions can be extracted and used to build training sets and power NLP and machine learning models. A database of user queries that have been filtered into "question intent" queries can be used to quickly build out the training set without the time investment of manual collection. "Question intent" can imply that the user had a question, but has learned that the "who/what/where/when/why" words are unnecessary in a search engine, and has omitted them. The full question generation system can use the regular expressions used to filter questions from queries, and group these by what type of question word they likely imply. The "question intent" queries can then be run through a script that appends the interrogative word on, which can then be used as a training set for a cognitive system.

Examples of question intent queries versus full questions include, "best hotels in New York," versus "What are the best hotels in New York?", or "symptoms of cancer," versus "What are the symptoms of cancer?" The question intent queries can be identified using regular expressions filters on the full query dataset. These patterns can be pre-sorted into the type of interrogative word they are missing.

FIG. 1 depicts a schematic diagram of one illustrative embodiment of a cognitive system 100 implementing a question and answer (QA) pipeline 108 and a full question generation system 120 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables full question generation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receive inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 140. In an embodiment, full questions can be generated and entered into the QA system using the full question generation system 120 described herein. The cognitive system 100 parses and interprets a full question via a QA pipeline 108, and provides a response containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question (which can be a full question generated by the full question generation system 120), which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing a full question generation system 120. As described further in FIGS. 4 and 5, the full question generation system 120 can receive a set of query data 150, which can be located in a repository of query data 150. In an embodiment, the query data can be generated by collecting user inputs previously input into a general internet search engine 151. The full question generation system 120 can parse the query data 150 using a full question identification module 121, a question intent query identification module 122, a sorting module 123, and an appending module 124 to create a complete set of full questions, which can then be incorporated back into the corpus 140 or analyzed by the cognitive system 100 through the QA system pipeline 108.

Figure 2:
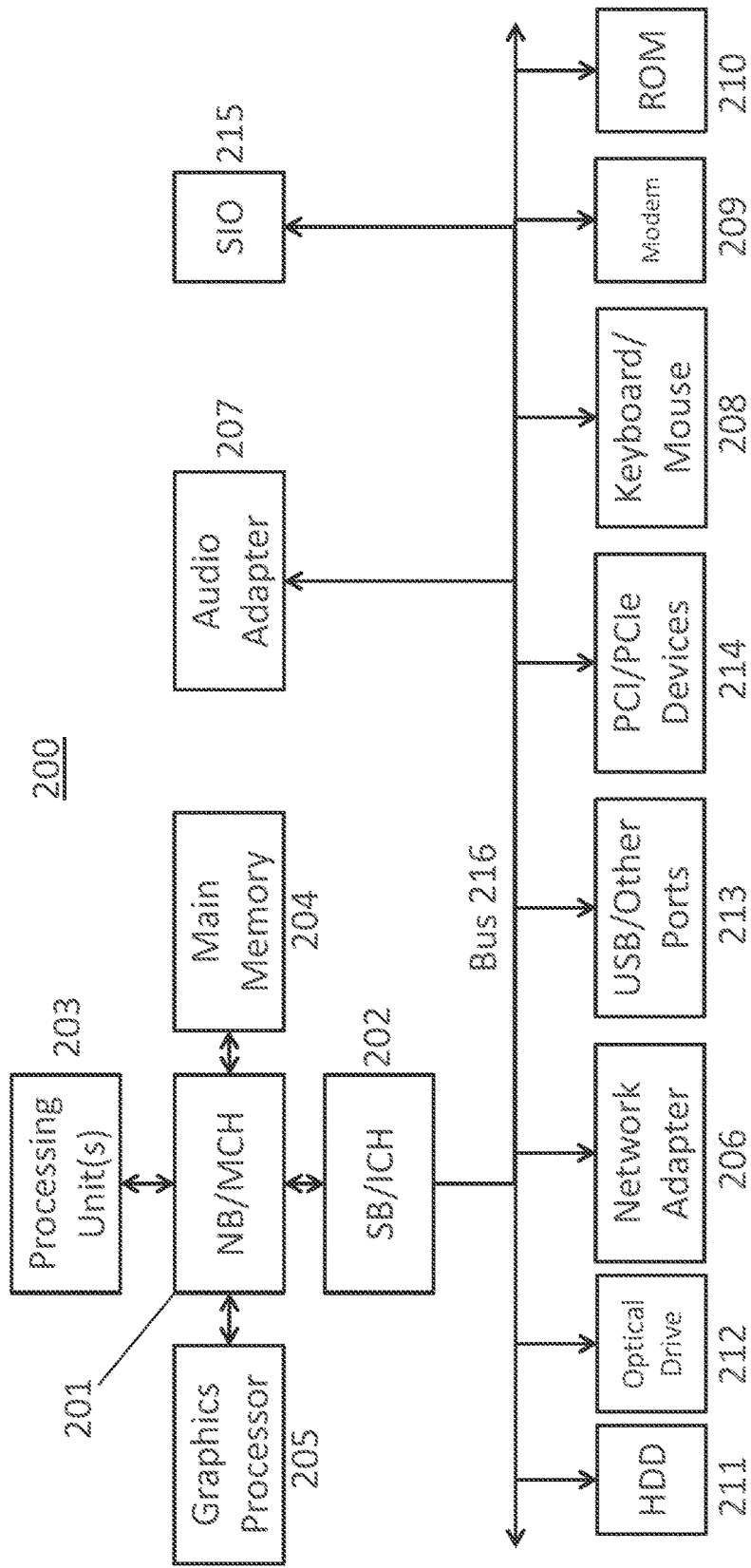
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the full question generation system 120 and cognitive system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer System p® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the full question generation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
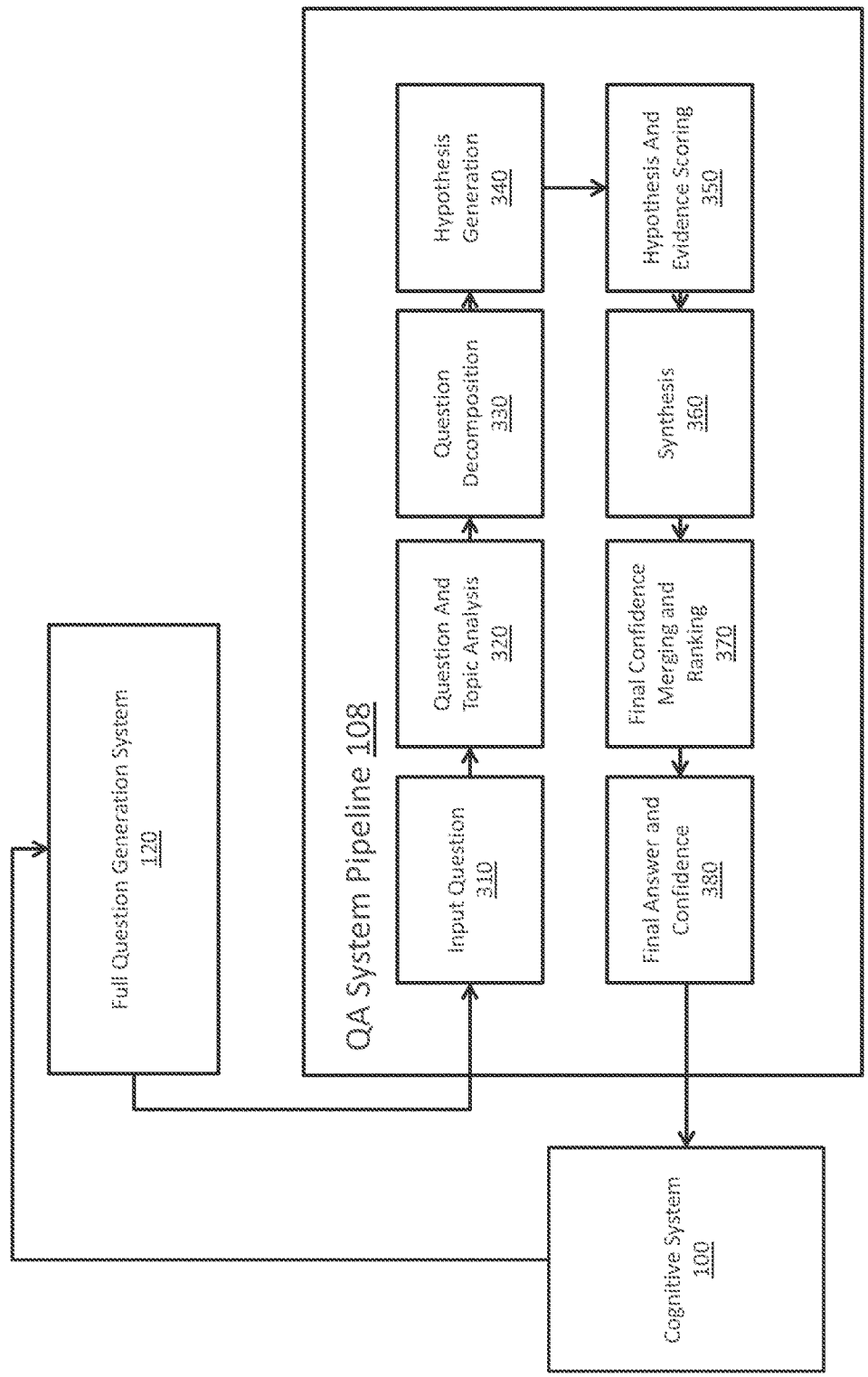
FIG. 3 illustrates a QA system pipeline, of a cognitive system, for processing an input question generated from the full question generation system in accordance with one illustrative embodiment.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc., are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 108 may be provided for interfacing with the pipeline 108 and implementing the improved functionality and operations of the illustrative embodiments.

As shown in FIG. 3, the QA pipeline 108 comprises a plurality of stages 310-380 through which the cognitive system operates to analyze an input question and generate a final response. In an initial question input stage 310, the QA pipeline 108 receives an input question that is presented in a natural language format. That is, a user inputs, via a user interface, an input question for which the user wishes to obtain an answer, e.g., "Who are Washington's closest advisors?" Alternatively, the full question generation system can input a full question generated by the system. In response to receiving the input question, the next stage of the QA pipeline 108, i.e., the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referenced to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?" the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., "Adderall," the answer can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information. That is, these various sources themselves, different collections of sources, and the like, represent a different corpus within the corpora. There may be different corpora defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus within the corpora.

The queries are applied to one or more databases storing information about the electronic texts, documents, articles, websites, and the like, that make up the corpus of data/information, e.g., the corpus of data 140 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 108, in stage 350, then performs a deep analysis and comparison of the language of the input question and the language of each hypothesis or "candidate answer," as well as performs evidence scoring to evaluate the likelihood that the particular hypothesis is a correct answer for the input question. As described in FIG. 1, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e., a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 108 and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 108 that identifies a manner by which these scores may be combined to generate a confidence score or measure for the individual hypotheses or candidate answers. This confidence score or measure summarizes the level of confidence that the QA pipeline 108 has about the evidence that the candidate answer is inferred by the input question, i.e., that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information. In an embodiment, the ranked listing of candidate answers can be used to further train the full question generation system 120 in order for the system 120 to further refine its question generation abilities as greater and greater sets of training data and new query data are entered into the system 120.

Figure 4:
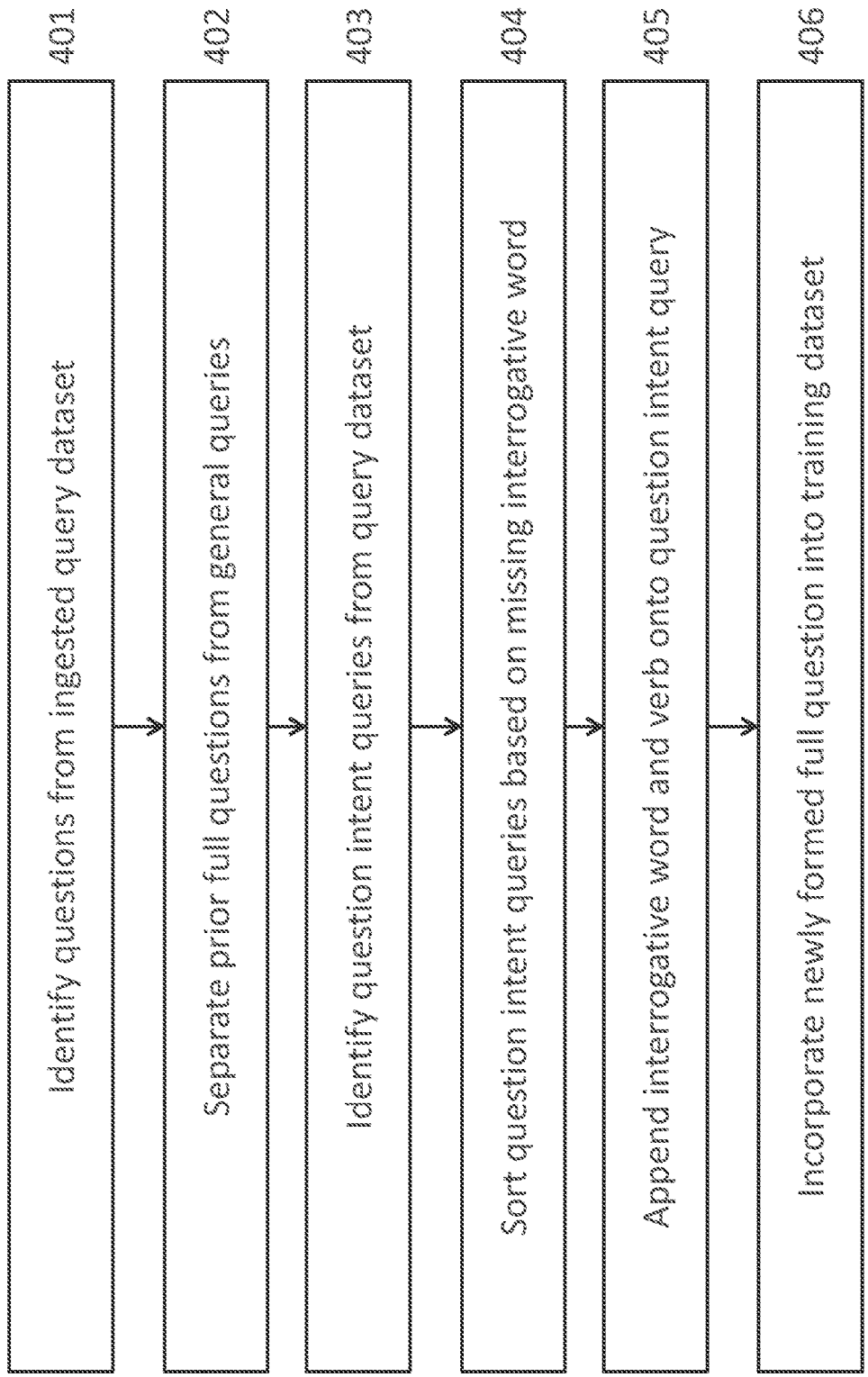
FIG. 4 illustrates a flowchart diagram depicting the function of the full question generation system, according to embodiments described herein.
Figure 5:
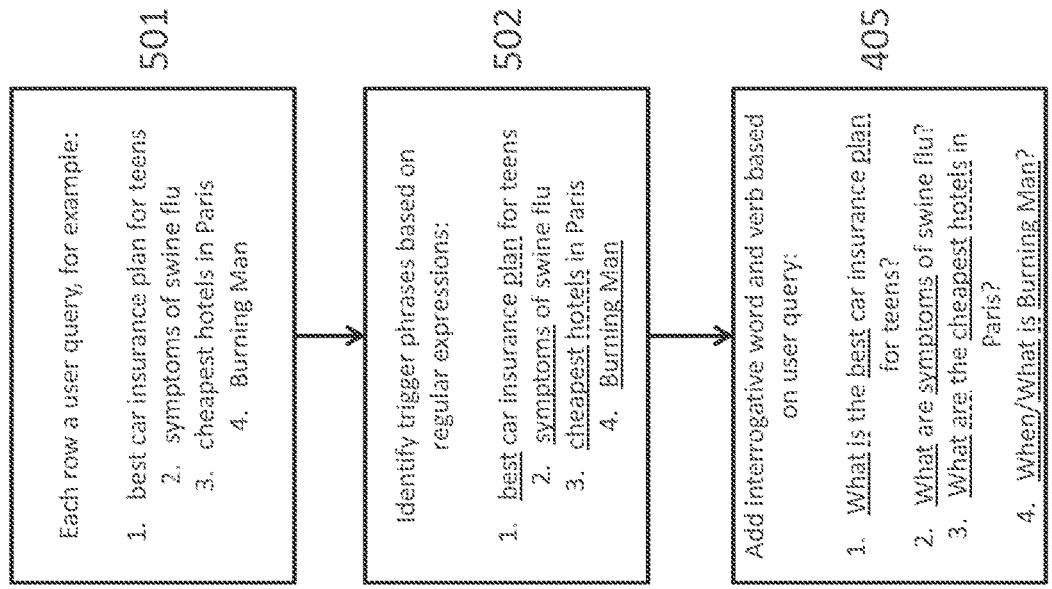
FIG. 5 illustrates a flowchart diagram depicting further functions of the full question generation system, according to embodiments described herein.

FIGS. 4 and 5 illustrate flowchart diagrams depicting the function of the full question generation system, according to embodiments described herein. The full question generation system can receive a dataset of queries. In an embodiment, the dataset of queries can originate from the various searches entered by one or more users of an internet search engine, which can be condensed into a dataset for reception by the full question generation system. In an embodiment, the search engine query dataset can be input into the full question generation system in real-time as queries are received by the search engine. Alternately, the search engine query dataset can be aggregated and input into the full question generation system in discrete pieces for processing. In an embodiment, the search engine query dataset can place each user query into a row 501.

Upon receipt of the query dataset, the full question generation system can identify questions from the received query dataset 401. Many user interactions with a search engine may not be question intent queries or questions, but may instead involve single words, generally known phrases, or titles of various forms of entertainment, all of which can be considered full questions in and of themselves. The full question generation system can be trained through the use of a list of commonly occurring titles or though prior analysis of a corpus of data to disregard all entries in the query dataset that are neither full questions nor question intent queries. Alternatively, the full question generation system can omit this step and analyze all entries in the query dataset as if they potentially contain a full question or a question intent query.

The full question generation system can, in addition to identifying questions from the received query dataset 401, separate prior full questions from general queries 402 using a full question identification module 121 (as shown in FIG. 1). A prior full question can be a query already having proper grammatical orientation, and can include an interrogative word, including "what," "who," "where," "when," "why," or "how." Prior full questions can be separated from the query dataset and analyzed by the cognitive system as described in FIG. 3.

From the filtered query dataset, the full question generation system can identify question intent queries 403 using a question intent query identification module 122 (as shown in FIG. 1). A question intent query can be a sequence of words that imply that the user had a question, but has omitted the interrogatory words due to search engine query practice of using keyword-based search terms to save on time. In an embodiment, regular expressions for natural language processing can be used to filter question intent queries from the query dataset. A regular expression can be a sequence of characters that can define a search pattern. Based on the regular expressions, the full question generation system can identify trigger phrases 502.

Based on the trigger phrases identified through use of the regular expressions, the full question generation system can sort the question intent queries based on the missing interrogative word 404 using a sorting module 123 (as shown in FIG. 1). The full question generation system can use a binning system through which the sorted question intent queries can be stored. In an embodiment, the full question generation system can separately bin question intent queries depending on if the missing word is "what," "who," "where," "when," "why," or "how." In an embodiment, a question intent query can be copied and binned in one or more bins, as the question intent query can be vague enough to allow for the generation of multiple full questions based upon which interrogative word is appended to the question intent query.

The full question generation system can append the question intent query with the proper interrogative word and verb 405 using an appending module 124 (as shown in FIG. 1). In an embodiment, a script can be utilized to append the interrogative word and verb onto the question intent query to create the full question. Additionally, during analysis of the question intent query, the plurality of the operative trigger phrase can be determined, such that the proper conjugation of "is" can be appended to the question intent query to ensure the full question is grammatically correct. For instance, singular trigger phrases can have appended the singular form "is," while plural trigger phrases can have the plural form "are," appended.

After generating the full questions, the full question generation system can incorporate the one or more full questions into a training dataset 406, which can be used by the cognitive system to train the QA system pipeline in order to refine its knowledge and create a larger corpus of known question and answer pairs. Each newly made full question can be used to further train the cognitive system. In an embodiment, un-canonical question forms can be additionally generated by the full question generation system, and can be used for the purpose of further training of a cognitive system as examples of nonsensical questions leading to incorrect or erroneous question-answer pairs. Un-canonical question forms can be generated by appending alternate interrogative words onto the question intent query. An alternate interrogative word is any interrogative word that is different from the original interrogative word appended to the question intent query.

Three examples illustrate the functionality of the full question generation system. From the query database of user searches on an internet search engine come the three user question intent queries: "best car insurance plan for teens," "symptoms of swine flu," "cheapest hotels in Paris," and "Burning Man." Using regular expressions for natural language processing, each of the user queries is analyzed to determine the relevant trigger phrases and their plurality. "Best" and "plan" are trigger phrases for the first user query; "symptoms" for the second; "cheapest" and "hotels" for the third; and "Burning Man" for the fourth. After binning the question intent queries based on their missing interrogative words, the full question generation system can add one or more interrogative words and a verb based on the question intent query. Thus, "best car insurance plan for teens," becomes "What is the best car insurance plan for teens?" "Symptoms of swine flu," becomes "What are symptoms of swine flu?" "Cheapest hotels in Paris," becomes "What are the cheapest hotels in Paris?" "Burning Man," due to its ambiguity, can become two full questions: "When is Burning Man?" and "What is Burning Man?" Each of the full questions can be input into the cognitive system and analyzed using the question-answer pipeline, further training the cognitive system.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method, in a data processing system comprising a processor and a memory comprising instructions which are executed by the processor to cause the processor to implement a full question generation system for training a cognitive system comprising a question-answer system pipeline, the method comprising:
   ingesting, into the full question generation system, a query dataset derived from one or more search queries entered by one or more users of an internet search engine;
   identifying questions from the ingested query dataset;
   separating, through a full question identification module, one or more prior full questions from the ingested dataset;
   identifying, through a question intent query identification module, one or more question intent queries from the query dataset using one or more regular expressions to detect at least one trigger phrase contained in each question intent query, wherein an interrogative word and a verb are missing from the one or more question intent queries;
   for each identified question intent query:
      sorting, through a sorting module, the question intent query into one or more bins based on one or more missing interrogative words, wherein each missing interrogative word corresponds to a different bin;
      determining whether the at least one trigger phrase is plural or singular;
      identifying a proper conjugation of the verb for the question intent query based on plurality or singularity of the at least one trigger phrase; and
      appending, through an appending module, the one or more missing interrogative words and the proper conjugation of the verb onto the question intent query to generate a full question;
   ingesting, through the cognitive system, the one or more generated full questions as training dataset;
   analyzing, through the question-answer system pipeline, each of the one or more generated full questions contained in the training dataset; and
   training the full question generation system based on the analysis of the one or more generated full questions by the question-answer system pipeline.

2. The method as recited in claim 1, further comprising:
   identifying one or more question intent queries from the query dataset using one or more regular expressions to detect at least one trigger phrase contained in each question intent query.

3. The method as recited in claim 1, further comprising:
   for each identified question intent query:
      generating one or more un-canonical full questions by appending an alternate interrogative work and verb to the question intent query.

4. The method as recited in claim 3, further comprising:
   incorporating the one or more un-canonical full questions into the training dataset.

5. The method as recited in claim 4, further comprising:
   analyzing, through the question-answer system pipeline, each of the one or more un-canonical full questions contained in the training dataset; and
   training the full question generation system based on the analysis of the one or more un-canonical full questions by the question-answer system pipeline.

6. A computer program product for full question generation, the computer program product comprising a computer readable storage medium having program instructions embodied therewith, the program instructions executable by a processor to cause the processor to:
   ingest, into a full question generation system, a query dataset derived from one or more search queries entered by one or more users of an internet search engine;
   identify questions from the ingested query dataset;
   separate, through a full question identification module, one or more prior full questions from the ingested dataset;
   identify, through a question intent query identification module, one or more question intent queries from the query dataset using one or more regular expressions to detect at least one trigger phrase contained in each question intent query, wherein an interrogative word and a verb are missing from the one or more question intent queries;
   for each identified question intent query:
      sort, through a sorting module, the question intent query into one or more bins based on one or more missing interrogative words, wherein each missing interrogative word corresponds to a different bin;
      determine whether the at least one trigger phrase is plural or singular;
      identify a proper conjugation of the verb for the question intent query based on plurality or singularity of the at least one trigger phrase; and
      append, through an appending module, the one or more missing interrogative words and the proper conjugation of the verb onto the question intent query to generate a full question;
   ingest, through a cognitive system comprising a question-answer system pipeline, the one or more generated full questions as training dataset;
   analyze, through the question-answer system pipeline, each of the one or more generated full questions contained in the training dataset; and
   train the full question generation system based on the analysis of the one or more generated full questions by the question-answer system pipeline.

7. The computer program product as recited in claim 6, wherein the processor is further caused to identify one or more question intent queries from the query dataset using one or more regular expressions to detect at least one trigger phrase contained in each question intent query.

8. The computer program product as recited in claim 6, wherein the processor is further caused to, for each identified question intent query:
   generate one or more un-canonical full questions by appending an alternate interrogative work and verb to the question intent query.

9. The computer program product as recited in claim 8, wherein the processor is further caused to incorporate the one or more un-canonical full questions into the training dataset.

10. The computer program product as recited in claim 9, wherein the processor is further caused to analyze, through the question-answer system pipeline, each of the one or more un-canonical full questions contained in the training dataset; and
   train the full question generation system based on the analysis of the one or more un-canonical full questions by the question-answer system pipeline.

11. A system for cognitive system training, comprising:
a full question generation processor configured to:
   ingest, into a full question generation system, a query dataset derived from one or more search queries entered by one or more users of an internet search engine;
   identify questions from the ingested query dataset;
   separate, through a full question identification module, one or more prior full questions from the ingested dataset;
   identify, through a question intent query identification module, one or more question intent queries from the query dataset using one or more regular expressions to detect at least one trigger phrase contained in each question intent query, wherein an interrogative word and a verb are missing from the one or more question intent queries;
   for each identified question intent query:
      sort, through a sorting module, the question intent query into one or more bins based on one or more missing interrogative words, wherein each missing interrogative word corresponds to a different bin;
      determine whether the at least one trigger phrase is plural or singular;
      identify a proper conjugation of the verb for the question intent query based on plurality or singularity of the at least one trigger phrase; and
      append, through an appending module, the one or more missing interrogative words and the proper conjugation of the verb onto the question intent query to generate a full question;
   ingest, through a cognitive system comprising a question-answer system pipeline, the one or more generated full questions as training dataset;
   analyze, through the question-answer system pipeline, each of the one or more generated full questions contained in the training dataset; and
   train the full question generation system based on the analysis of the one or more generated full questions by the question-answer system pipeline.

12. The system as recited in claim 11, wherein the full question generation processor is further configured to identify one or more question intent queries from the query dataset using one or more regular expressions to detect at least one trigger phrase contained in each question intent query.

13. The system as recited in claim 11, wherein the full question generation processor is further configured to, for each identified question intent query:
   generate one or more un-canonical full questions by appending an alternate interrogative work and verb to the question intent query.

14. The system as recited in claim 13, wherein the full question generation processor is further configured to incorporate the one or more un-canonical full questions into the training dataset;
   analyze, through a question-answer system pipeline, each of the one or more un-canonical full questions contained in the training dataset; and
   train the full question generation system based on the analysis of the one or more un-canonical full questions by the question-answer system pipeline.

* * * * *